(12) United States Patent
Mandel et al.

(10) Patent No.: US 10,486,364 B2
(45) Date of Patent: Nov. 26, 2019

(54) SYSTEM AND METHOD FOR FORMING INTEGRATED INTERFACES WITHIN A THREE-DIMENSIONALLY PRINTED OBJECT WITH DIFFERENT BUILD MATERIALS

(71) Applicant: Xerox Corporation, Norwalk, CT (US)

(72) Inventors: Barry P. Mandel, Fairport, NY (US); Paul J. McConville, Webster, NY (US); Peter J. Nystrom, Webster, NY (US); Jeffrey J. Folkins, Rochester, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 520 days.

(21) Appl. No.: 15/145,304

(22) Filed: May 3, 2016

(65) Prior Publication Data

US 2017/0320270 A1 Nov. 9, 2017

(51) Int. Cl.
| | |
|---|---|
| *B29C 64/264* | (2017.01) |
| *B33Y 10/00* | (2015.01) |
| *B33Y 30/00* | (2015.01) |
| *B33Y 50/02* | (2015.01) |
| *B29C 64/268* | (2017.01) |
| *B29C 64/112* | (2017.01) |
| *B29C 64/118* | (2017.01) |
| *B29C 35/08* | (2006.01) |
| *B29K 101/12* | (2006.01) |
| *B29K 105/00* | (2006.01) |

(52) U.S. Cl.
CPC .......... *B29C 64/264* (2017.08); *B29C 64/112* (2017.08); *B29C 64/118* (2017.08); *B29C 64/268* (2017.08); *B33Y 10/00* (2014.12); *B33Y 30/00* (2014.12); *B33Y 50/02* (2014.12); *B29C 35/0805* (2013.01); *B29C 2035/0827* (2013.01); *B29K 2101/12* (2013.01); *B29K 2105/0058* (2013.01)

(58) Field of Classification Search
None
See application file for complete search history.

(56) References Cited

U.S. PATENT DOCUMENTS

| | | |
|---|---|---|
| 7,785,667 B2 | 8/2010 | Quinones et al. |
| 7,959,847 B2 | 6/2011 | Wicker et al. |
| 8,252,223 B2 | 8/2012 | Medina et al. |

(Continued)

FOREIGN PATENT DOCUMENTS

WO 2015/038072 A1 3/2015

OTHER PUBLICATIONS

Isaac Budmen; Understanding Shells, Layer Height and Infill; 2012; 1 Page; teambudmen.com.

*Primary Examiner* — Monica A Huson
*Assistant Examiner* — Kelsey C Grace
(74) *Attorney, Agent, or Firm* — Maginot Moore & Beck LLP (57) ABSTRACT

An additive manufacturing system operates at least one ejector and an extruder to form three-dimensional objects with photopolymer material and thermoplastic material. The system operates to deposit the two materials in a layer-by-layer manner. The photopolymer material provides high resolution finishes on the objects and the thermoplastic material enables strong and stable formation of internal portions of the objects.

11 Claims, 6 Drawing Sheets

(56) References Cited

U.S. PATENT DOCUMENTS

| | | |
|---|---|---|
| 8,562,324 B2 | 10/2013 | Pettis |
| 8,827,684 B1 | 9/2014 | Schumacher et al. |
| 2005/0015171 A1* | 1/2005 | Cruz-Uribe ............ B41J 25/308 700/118 |
| 2014/0048969 A1 | 2/2014 | Swanson et al. |
| 2014/0242208 A1 | 8/2014 | Elsworthy |
| 2014/0263738 A1 | 9/2014 | Aguilar et al. |

\* cited by examiner

SYSTEM AND METHOD FOR FORMING INTEGRATED INTERFACES WITHIN A THREE-DIMENSIONALLY PRINTED OBJECT WITH DIFFERENT BUILD MATERIALS

TECHNICAL FIELD

The device disclosed in this document relates to printers that produce three-dimensional objects and, more particularly, to systems and methods for producing three-dimensionally printed objects with different types of build material.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject or deposit successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Current three-dimensional object inkjet printers have significant limitations with regard to the viscosity range of the photopolymer materials that can be ejected, with most materials having an upper limit between 10 and 20 centipoise (cP). After the photopolymer materials are ejected onto the object being formed, the materials are cured with a ultraviolet (UV) or other appropriate radiation source. These photopolymer materials can be expensive and may physical properties, such as strength and stability, which are useful for the production of sturdy objects capable of a wide range of functionality. Other additive manufacturing methods, such as Fused Filament Fabrication (FFF) or Stereolithography (SLA), expand the range of materials used to produce products. There materials are more durable and are usually much cheaper than cured photopolymer materials. The surface finish of parts made using FFF is not as good as those made using UV inkjet and UV inkjet can more easily make parts with high resolution surfaces. Therefore, a system capable of producing composite objects having cured photopolymer materials and the materials used by the FFF and SLA methods would be advantageous.

SUMMARY

A manufacturing method that integrates extruded build materials with cured photopolymers in a three-dimensional object increases the robustness and durability of the structure. The method includes operating with a controller at least one ejector in a plurality of ejectors to eject drops of a photopolymer material towards a substrate, the drops of photopolymer material being formed with a perimeter portion that extends above a base portion so the perimeter portion and the base portion define a volume, operating with the controller a source of ultraviolet (UV) radiation to cure the drops of photopolymer material at least partially, operating with the controller an extruder to extrude a thermoplastic material within the volume defined by base portion and the perimeter portion, operating with the controller the at least one ejector to eject additional photopolymer material onto the thermoplastic material to form a surface over at least a portion of the thermoplastic material, and operating with the controller the source of UV radiation to cure the drops of photopolymer material and the additional photopolymer material.

A system that integrates extruded build materials with cured photopolymers in a three-dimensional object increases the robustness and durability of the structure. The system includes a planar member, at least one ejector configured to eject drops of photopolymer material towards the planar member, a source of ultraviolet (UV) radiation, an extruder configured to extrude thermoplastic material towards the planar member, and a controller operatively connected to the at least one ejector, the source of UV radiation, and the extruder. The controller is configured to: operate at least one ejector in a plurality of ejectors to eject drops of a photopolymer material towards the planar member, the drops of photopolymer materials forming a perimeter portion that extends above a base portion so the perimeter portion and the base portion define a volume, operate the source of UV radiation to cure the drops of photopolymer material at least partially, operate the extruder to extrude a thermoplastic material within the volume of the defined by the base portion and the perimeter portion of the at least partially cured photopolymer material, operate the at least one ejector to eject additional photopolymer material onto the thermoplastic material to form a surface over at least a portion of the thermoplastic material, and operate the source of UV radiation to cure the drops of photopolymer material and the additional photopolymer material.

BRIEF DESCRIPTION OF THE DRAWINGS

The foregoing aspects and other features of a system that integrates extruded build materials with cured photopolymers in an additive manufactured three-dimensional object are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals designate like elements. As used in this document, the term "extruder" refers to a device that is capable of producing a continuous stream of thermoplastic material in a semi-solid form. The term "semi-solid" means a material state at which a material is malleable, but has not transitioned to a liquid phase. The term "ejector" refers to a device that expels drops of a liquid material. An ejector can be an inkjet printhead having an array of devices that expel liquid drops or it can be an array of pin ejectors, each one of which expels liquid drops. The term "leveling device" means a device that has an abrasive surface, smooth rotating surface, or a cutter that removes a portion of a material forming structure in a three-dimensional object. The term "thermoplastic" means a material that is solidly rigid at a temperature below its glass transition temperature and that is semi-solid above its glass transition temperature. Examples of thermoplastics include, but are not limited to, polymethyl methacrylate, acrylonitrile butadiene styrene (ABS), polyamides, poly carbonates, and the like. Of the commonly used thermoplastics for printing three-dimensional objects, polylactic acid (PLA) is especially useful because it has a relatively low extrusion temperature compared to other thermoplastic materials such as ABS. The term "photopolymer" refers to materials that undergo structural changes when exposed to electromagnetic radiation.

Figure 1:
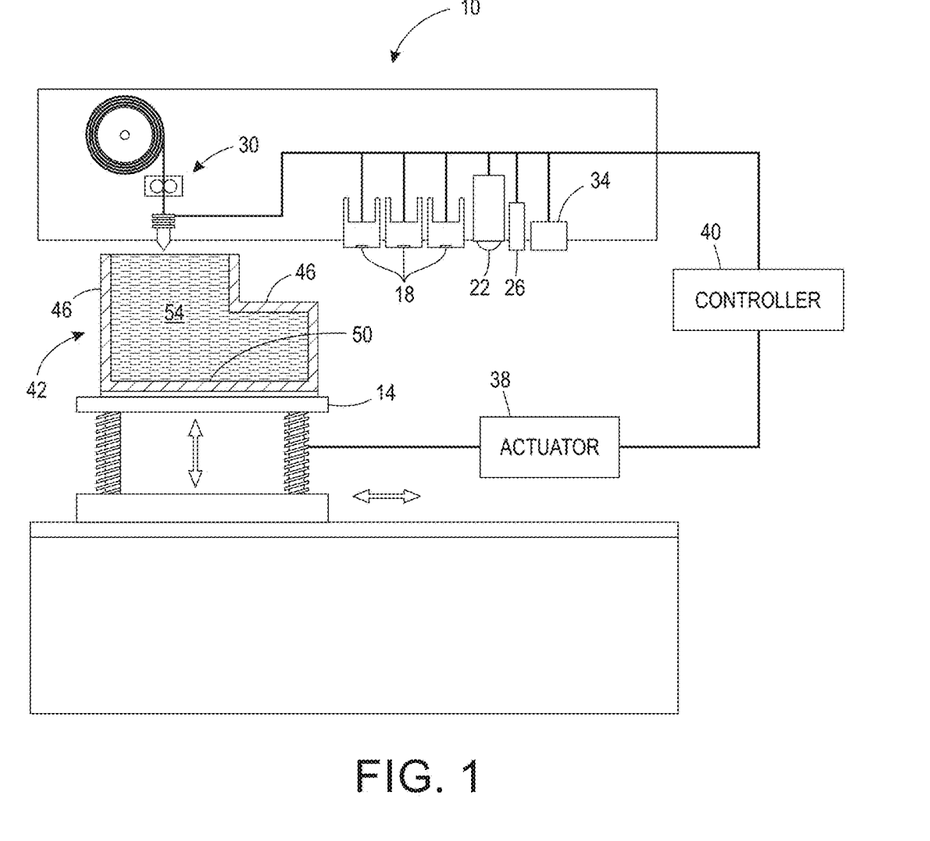
FIG. 1 illustrates a system for forming a three-dimensional object with different materials.

An additive manufacturing system for producing three-dimensional objects with multiple materials is shown in FIG. 1. The system 10 includes a planar member 14, one or more ejectors 18, a leveling device 22, a source of ultraviolet (UV) radiation 26, one or more extruders 30, a cooler 34, and a controller 40. The ejectors 18 can be configured as inkjet printheads. At least one of the ejectors 18 is configured to eject drops of photopolymer material towards the planar member 14. The extruder 30 is configured to extrude thermoplastic material towards the planar member 14. An actuator 38 is operatively connected to the planar member 14 and is configured to move the planar member 14 selectively beneath the extruder 30, the ejectors 18, the UV source 26, the cooler 34, and the leveling device 22 to enable the controller 34 to operate these components and form a three-dimensional object 42 on the planar member 14. Alternatively, the actuator(s) 38 are operatively connected to the ejectors 18, the UV radiation source 26, the leveling device 22, the cooler 34, and the extruder 30 to enable the controller to move these components with reference to the planar member 14 for the manufacture of an object 42. The cooler 34 is a device that cools the photopolymer after it is cured and can be implemented with a fan.

The controller 40 is operatively connected to the ejectors 18, the leveling device 22, the UV source 26, and the extruder 30. The controller is configured with programmed instructions stored in a memory operatively connected to the controller to operate the components of system 10. Specifically, the controller 40 is configured to operate at least one ejector 18 in the plurality of ejectors to eject drops of a photopolymer material to form at least one layer of a photopolymer material on the planar member 14. As shown in FIG. 1, the at least one layer is formed with a perimeter portion 46 that extends above a base portion 50 so the perimeter portion and the base portion define a volume 54. The controller is also configured to operate the source of UV radiation 26 to cure the at least one layer of photopolymer at least partially and to operate the extruder 30 to extrude a thermoplastic material within the volume 54 of the at least one layer of the at least partially cured photopolymer material. The controller 40 is also configured to operate one or more of the ejectors 18 to eject additional photopolymer material onto the thermoplastic material in the volume 54 to form a surface over at least a portion of the thermoplastic material, as shown in the perimeter portion 46 of the right side of the object 42. The controller is configured to operate the UV radiation source 26 to finish the curing of the photopolymer material and the additional photopolymer material. In this manner, the interior of the object has been formed with thermoplastic material and the exterior has been formed with photopolymer material. As noted previously, the system 10 also includes the leveling device 22, which is operatively connected to the controller 40 and the controller 34 is further configured to operate the leveling device 26 to remove a portion of the at least one layer of photopolymer material to ensure that an upper surface of the perimeter portion is located at a predetermined height above the base portion of the photopolymer material. The controller 40 is also configured to operate the cooler to remove heat from cured photopolymer.

Figure 2:
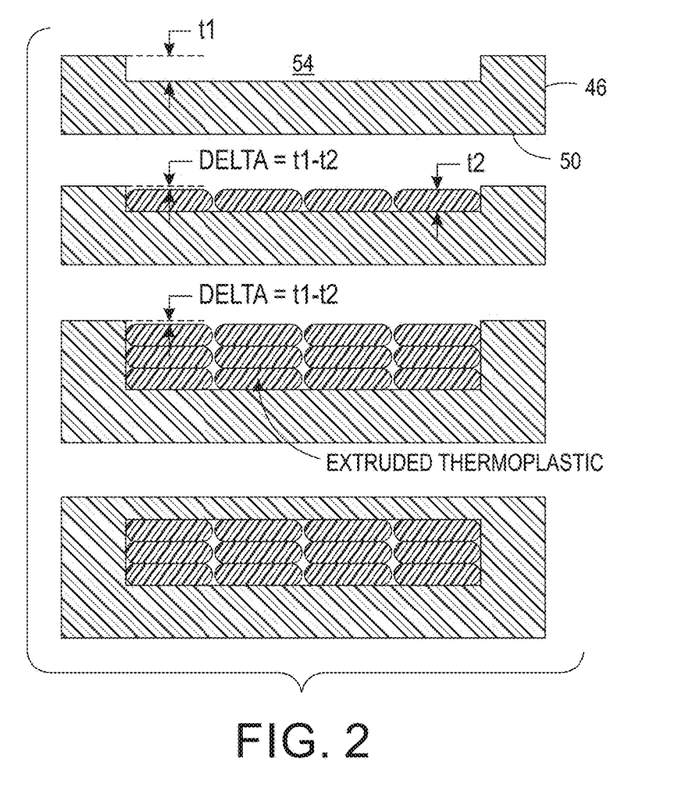
FIG. 2 illustrates an example of a hybrid structure that is formed with the system of FIG. 1.

The configuration of the system 10 and its controller as described above enables the controller to operate in numerous ways to form particular structures in three-dimensional objects. For example, as shown in FIG. 2, the controller 34 operates one or more of the ejectors 18 to form the volume 54 with a predetermined height of t1. The controller 34 then operates the extruder 30 to extrude the thermoplastic material within the volume of the photopolymer structure to position an upper surface of the thermoplastic material at a predetermined height t2 that is less than the predetermined height t1 of the perimeter portion above the base portion of the at least one layer of photopolymer material. The difference Delta between the two heights enables the controller 34 to operate the leveling device 26 to level the next layers of photopolymer material without contacting the thermoplastic material. The difference Delta can be in a range of about 25 to about 150 microns, although other ranges are possible.

Figure 3:
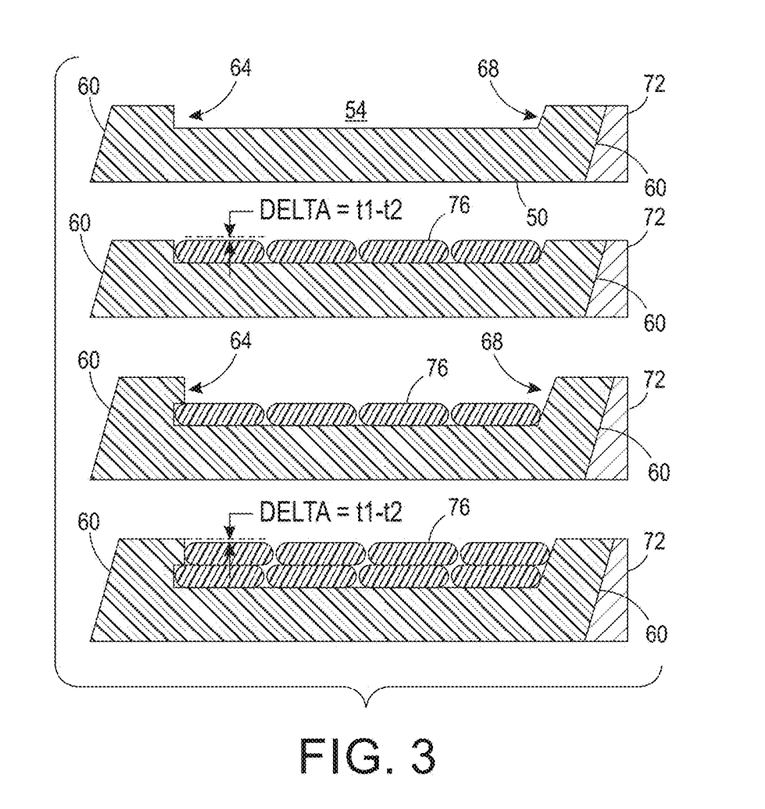
FIG. 3 illustrates an example of another hybrid structure having sloped walls that is formed with the system of FIG. 1.

FIG. 3 shows a sloped wall structure that can be formed with the system 10. To form this type of structure, the controller 34 operates at least one ejector 18 to form the perimeter portion 46 with at least one surface that is positioned at a non-perpendicular angle with respect to the planar member that supports the base portion 50 of the photopolymer material. As shown in the figure, the external walls 60 can be slanted away from the volume 54. Likewise, the internal walls of the volume 54 can be shaped for different accommodations of the thermoplastic material. For example, internal wall 64 is first formed as being perpendicular to the base portion 50, while the internal wall 68 slopes away from the volume 54. Also, as shown in the figure, the thermoplastic material 76 can be extruded into the volume 54 with a height that is less than the height of the volume as described above. The wall 64 can then be extended over the extruded thermoplastic material as shown in the lower two depictions presented in the figure. The controller 34 can also operate one or more ejectors 18 or the extruder 30 to eject drops of support material to form support for one of the sloping external walls 60. The extent of the tip of the extruder may limit the ability to extrude thermoplastic material all the way up to walls 64 or 68 and completely fill the difference delta. Consequently, this gap can be filled with photopolymer material in subsequent passes.

Leaving openings in the edges of the thermoplastic layers allows printing of interdigitated photopolymer. The interdigitated photopolymer allows the layers to interlock and to ensure improved adherence at walls. Also by varying the direction and the position of the boundary between the photopolymer material and thermoplastic material at different heights, the interlocking of the materials can improve the quality of the interface and thus the part.

Figure 4:
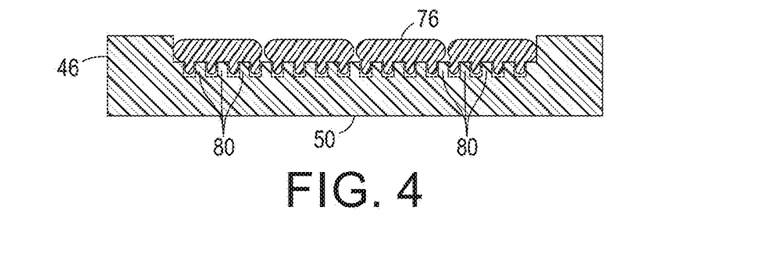
FIG. 4 illustrates an example of a hybrid structure having protrusions along a bottom portion of the object that is formed with the system of FIG. 1.
Figure 5:
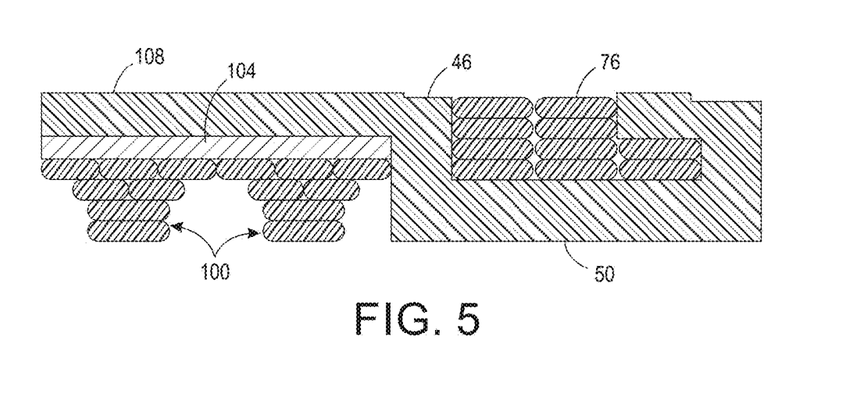
FIG. 5 illustrates an example of a hybrid support structure that is formed with the system of FIG. 1.
Figure 6:
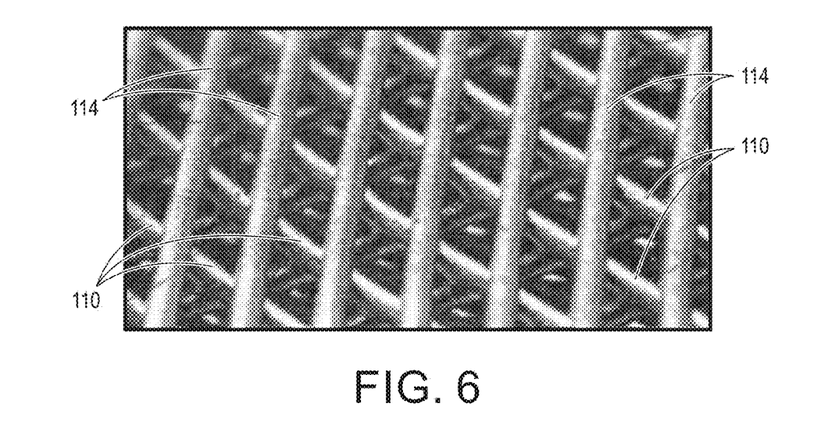
FIG. 6 illustrates an example of a hybrid structure having a plurality of thermoplastic members that are oriented different with respect to one another that is formed with the system of FIG. 1.
Figure 7A:
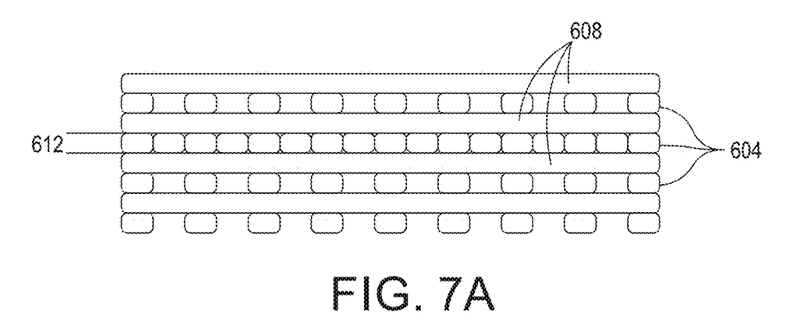
FIG. 7A is a cross-sectional side view of a matrix structure similar to the one shown in FIG. 6
Figure 7B:
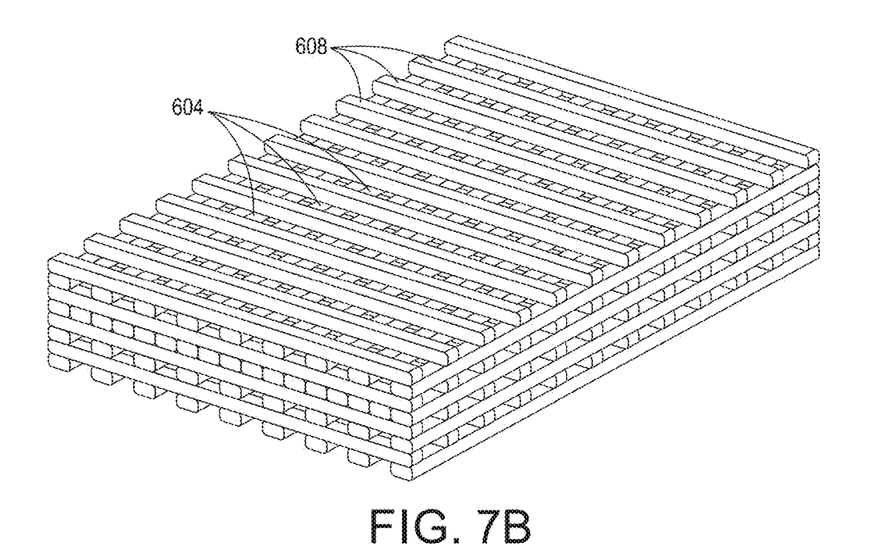
FIG. 7B is a top view of the matrix structure in FIG. 7A. The view of FIG. 7A depicts the inclusion of solid layers of material in the matrix structure to prevent the flow of liquid photopolymer into the matrix too deeply.

System 10 can also form the useful structure shown in FIG. 4. In FIG. 4, the controller 34 operates at least one ejector 18 to form the base portion 50 with protrusions 80 that extend from the base portion 50 into the volume formed by the perimeter portion 46 and the base portion 50 or with indentations formed in the surface of base portion 50. The controller 34 then operates the extruder 30 to fill areas between the protrusions with the thermoplastic material 76. This type of structure helps improve the adhesion between the thermoplastic material in the volume with the photopolymer forming the base portion 50. FIG. 5 depicts a support structure that is more economically formed with thermoplastic material and photopolymer material together. The controller 34 operates another extruder 30 to extrude a support thermoplastic material and then operates one of the ejectors to eject drops of another support material 104. The ejected support material 104 is different than the extruded thermoplastic support material 100. The extruded support material is positioned in an area adjacent to an external wall of the perimeter portion 46 and the ejected support material covers the thermoplastic support material to form a surface over the extruded support material. The controller 34 then operates one of the ejectors 18 to eject drops of photopolymer material 108 on the ejected support material 104 to extend the perimeter portion 46 over the surface formed over the other ejected support material 104. This hybrid structure is more economical than one formed with the ejected support material alone. Another useful hybrid structure that can be formed within a three-dimensional object and is useful for upper portions of an object where photopolymer material is deposited on top of extruded thermoplastic is shown in FIG. 6. In that figure, the controller 34 operated the extruder 30 to form a first plurality of thermoplastic members 110 having a first orientation and to form a second plurality of thermoplastic members 114 having a second orientation that is different than the first orientation over the first plurality of thermoplastic members. The first plurality and the second plurality of thermoplastic members form interstitial spaces between the thermoplastic members in the first plurality of thermoplastic members and the thermoplastic members in the second plurality of thermoplastic members. The controller 34 also operates one of the ejectors to eject drops of photopolymer material into at least some of the interstitial spaces between the thermoplastic members in the first plurality of thermoplastic members 110 and the thermoplastic members in the second plurality of thermoplastic members 114 before forming a surface with photopolymer material over the extruded thermoplastic material. The drops of photopolymer material can be ejected into these interstitial spaces because the diameters of the drops are smaller than the width of the extruded thermoplastic members. Because the photopolymer is fluid until cured, it tends to flow around the thermoplastic. If the photopolymer penetrates too deeply into the matrix of interstitial spaces between thermoplastic members, then it can be difficult to cure. To prevent this excessive penetration, solid layers can be formed within the spaces to inhibit flow too far into the thermoplastic matrix. The solid layers can be formed by operating an extruder to form the solid layers with thermoplastic material or by operating an ejector to form the solid layers with photopolymer material that is cured before the thermoplastic members are formed over them. A side view of a volume formed with thermoplastic members is shown in FIG. 7A and a top view of that structure is shown in FIG. 7B. The thermoplastic members 604 extend into and out of the plane of the figure and the thermoplastic members 608 are generally orthogonal to the members 604 another other angular orientations can be used. The layers 612 illustrate solid layers of thermoplastic material that prevents the ingress of photopolymer into the matrix structure too deeply. Because the liquid photopolymer penetrates no further than the solid layers, it stays close enough to the surface to be cured with scattered or transmitted light if not exposed directly. Choosing a thermoplastic without colorants that absorb the light used for curing is also beneficial.

Figure 8:
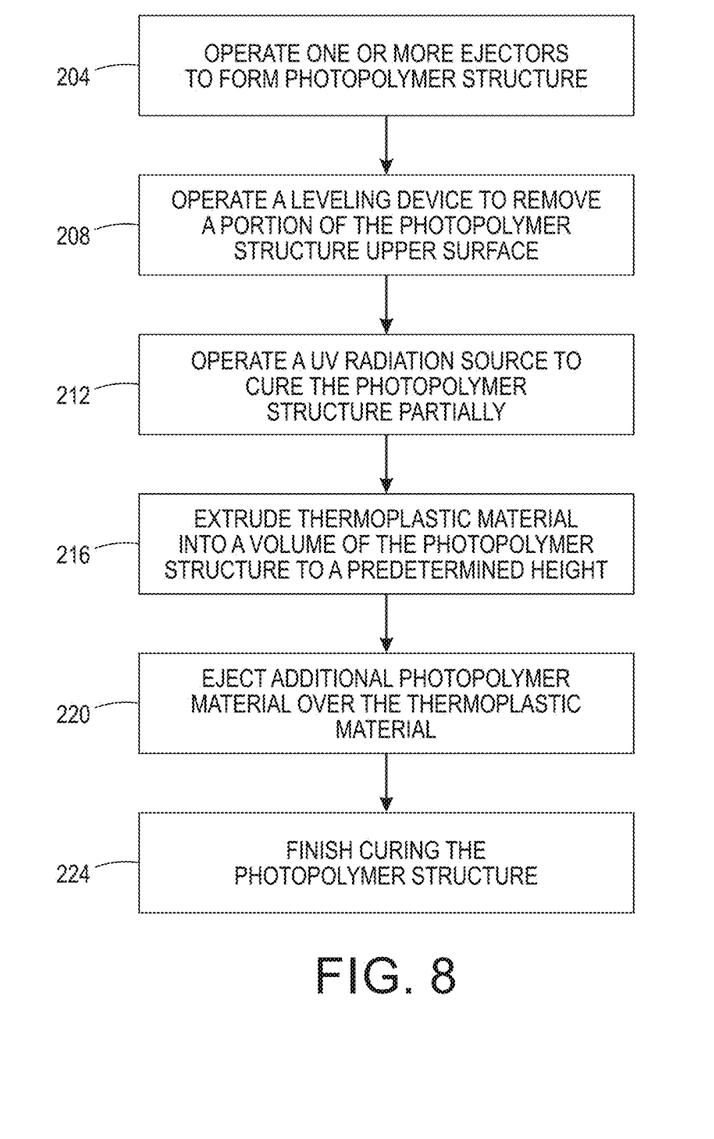
FIG. 8 is a flow diagram of an additive manufacturing method for manufacturing three-dimensional objects with different materials.

An additive manufacturing method 200 that forms objects with different materials from different types of material applicators is shown in FIG. 8. In the description of this method, statements that a process is performing some task or function refers to a controller or general purpose processor executing programmed instructions stored in a memory operatively connected to the controller or processor to manipulate data or to operate one or more components in the printer to perform the task or function. The controller 34 noted above can be such a controller or processor. Alternatively, the controller 34 can be implemented with more than one processor and associated circuitry and components, each of which is configured to form one or more tasks or functions described herein.

The method begins with the controller operating at least one ejector in a plurality of ejectors to eject drops of a photopolymer material towards a substrate (block 204). The photopolymer material is formed with a perimeter portion that extends above a base portion so the perimeter portion and the base portion define a volume as shown in FIG. 2. The controller operates a leveling device to remove a portion of the drops of photopolymer material on the substrate to enable the perimeter portion to have an upper surface located at a predetermined height about the base portion (block 208). The controller operates an ultraviolet (UV) radiation source to cure the one or more layers of photopolymer partially (block 212). As used in this document, "operates an UV radiation source" means to activate the source so it radiates, move the source so radiation from the source impinges on photopolymer material, or open and close a shutter that enables emission of the radiation selectively. The controller then operates an extruder to extrude a thermoplastic material within the volume of the partially cured photopolymer material to position an upper surface of the thermoplastic material at a height that is less than the predetermined height of the perimeter portion above the base portion of the at least one layer of photopolymer material (block 216). One or more ejectors are operated by the controller to eject additional photopolymer material onto the thermoplastic material to form a surface over at least a portion of the thermoplastic material (block 220). The UV radiation source is again operated by the controller to cure the earlier ejected photopolymer material and the additional photopolymer material (block 224).

As explained above, the internal and external walls of the perimeter portion can be slanted and the upper surface of the base portion can be formed with protrusions that extend from the base portion into the volume formed by the perimeter portion and the base portion. The controller then operates the extruder to fill areas between the protrusions with the thermoplastic material. This process can also be used to extrude a support material in an area adjacent to an external wall of the perimeter portion, eject another support material that is different than the ejected support material over the extruded support material to form a surface over the extruded support material, and eject drops of photopolymer material over the ejected support material to extend the perimeter portion over the surface formed over the other ejected support material. This process also enables the controller to operate the extruder to form a first plurality of thermoplastic members having a first orientation and to form a second plurality of thermoplastic members having a second orientation that is different than the first orientation over the first plurality of thermoplastic members. The interstitial spaces between the thermoplastic members in the first plurality of thermoplastic members and the thermoplastic members in the second plurality of thermoplastic members can be filled with photopolymer material or left empty to reduce the weight of the object.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An additive manufacturing system for producing three-dimensional objects with multiple materials comprising:
a planar member;
at least one ejector configured to eject drops of photopolymer material towards the planar member;
a source of ultraviolet (UV) radiation;
an extruder configured to extrude thermoplastic material towards the planar member;
a leveling device; and
a controller operatively connected to the at least one ejector, the source of UV radiation, and the extruder, the controller being configured to:
operate at least one ejector in a plurality of ejectors to eject drops of a photopolymer material towards the planar member to form a perimeter portion that extends to a first predetermined height above a base portion so the perimeter portion and the base portion define a volume;
operate the source of UV radiation to cure the drops of photopolymer material at least partially;
operate the extruder to extrude a thermoplastic material to a second predetermined height within the volume defined by the base portion and the perimeter portion of the at least partially cured photopolymer material, the second predetermined height being less than the first predetermined height;
operate the leveling device to remove a portion of the perimeter portion without engaging the thermoplastic material at the second predetermined height within the volume defined by the base portion and the perimeter portion;
operate the at least one ejector to eject additional photopolymer material onto the thermoplastic material to form a surface over at least a portion of the thermoplastic material; and
operate the source of UV radiation to cure the drops of photopolymer material and the additional photopolymer material.

2. The system of claim 1, the controller being further configured to:
operate the at least one ejector to form the perimeter portion with at least one surface that is positioned at a perpendicular angle with respect to a planar member that supports the base portion.

3. The system of claim 1, the controller being further configured to:
operate the at least one ejector to form the base portion with protrusions that extend from the base portion into the volume formed by the perimeter portion and the base portion; and
operate the extruder to fill at least partially areas between the protrusions with the thermoplastic material.

4. The system of claim 1, the controller being further configured to:
operate the extruder to extrude a support material in an area adjacent to an external wall of the perimeter portion;
operate the ejector to eject another support material over the extruded support material to form a surface over the extruded support material; and
operate the ejector that ejects drops of photopolymer material to extend the perimeter portion over the surface formed over the other ejected support material.

5. The system of claim 1 further comprising:
another extruder configured to extrude a support material;
another ejector configured to eject drops of another support material, the ejected support material being different than the extruded support material; and
the controller being operatively connected to the other extruder and the other ejector, the controller being further configured to:
operate the other extruder to extrude a support material in an area adjacent to an external wall of the perimeter portion;
operate the other ejector to eject another support material over the extruded support material to form a surface over the extruded support material; and
operate the ejector that ejects drops of photopolymer material to extend the perimeter portion over the surface formed over the other ejected support material.

6. The system of claim 1, the controller being further configured to:
operate the extruder to form a first plurality of thermoplastic members having a first orientation and to form a second plurality of thermoplastic members having a second orientation that is different than the first orientation over the first plurality of thermoplastic members, the first plurality and the second plurality of thermoplastic members forming interstitial spaces between the thermoplastic members in the first plurality of thermoplastic members and the thermoplastic members in the second plurality of thermoplastic members.

7. The system of claim 5, the controller being further configured to:
operate the ejector to eject drops of photopolymer material into at least some of the interstitial spaces between the thermoplastic members in the first plurality of thermoplastic members and the thermoplastic members in the second plurality of thermoplastic members before forming the surface with the photopolymer material over the extruded thermoplastic material.

8. The system of claim 6, the ejector being further configured to eject drops of photopolymer material have a diameter that is less than a width of the thermoplastic members in the first plurality and second plurality of thermoplastic members.

9. The printer of claim 7, the controller being further configured to:
   operate the ejector to form a solid layer of photopolymer material within the structure formed by the first plurality of thermoplastic members and the second plurality of thermoplastic members.

10. The printer of claim 7, the controller being further configured to:
    operate the extruder to form a solid layer of photopolymer material within the structure formed by the first plurality of thermoplastic members and the second plurality of thermoplastic members.

11. The system of claim 1, the controller being further configured to:
    operate the at least one ejector to form the perimeter portion with at least one surface that is positioned at a non-perpendicular angle with respect to the planar member that supports the base portion.

* * * * *